April 28, 1936. H. S. JANDUS ET AL 2,039,005
SPARE TIRE COVER
Filed Nov. 9, 1934
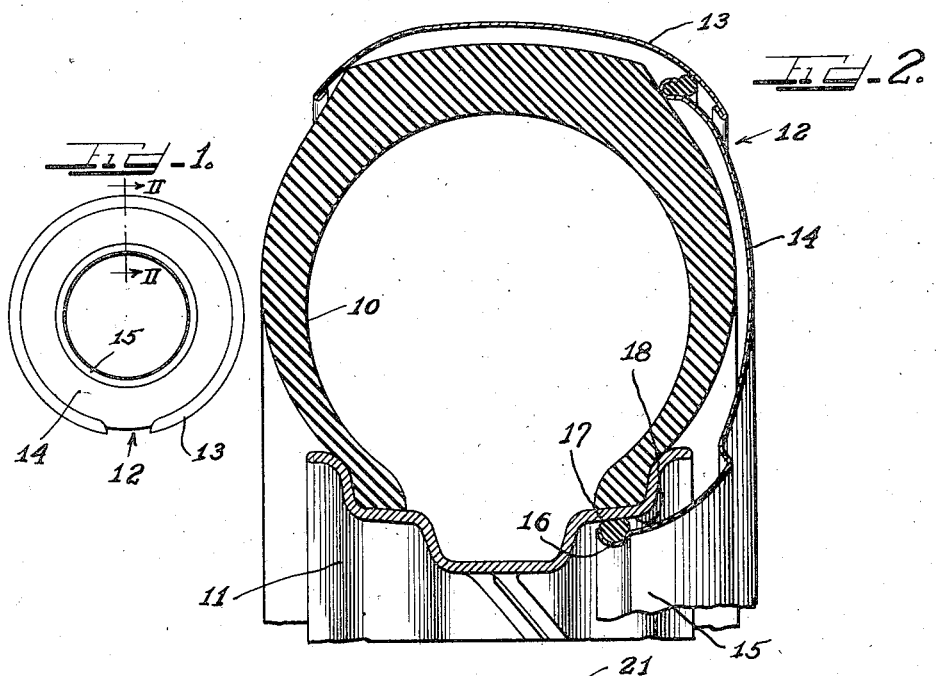
Inventors
Herbert S. Jandus.
Arthur P. Fergueson
by Charles H. Hill Attys.

Patented Apr. 28, 1936

2,039,005

UNITED STATES PATENT OFFICE 2,039,005

SPARE TIRE COVER

Herbert S. Jandus and Arthur P. Fergueson, Detroit, Mich., assignors to Lyon Cover Company, Detroit, Mich., a corporation of Michigan Application November 9, 1934, Serial No. 752,255

10 Claims. (Cl. 150—54)

This invention relates to spare tire covers and more particularly to a spare tire cover adapted to cooperate with a tire rim flange when mounted on a spare tire so as to aid in the support and centering of the cover on the tire.

An object of this invention is to provide a cushion between a portion of a spare tire cover and the tire rim on which the spare tire is carried.

Another object of this invention is to provide a spare tire cover with means cooperable with the tire rim to aid in the centering of the cover on the tire.

A further object of the invention is to provide a spare tire cover which not only has a yieldable contact with the spare tire but also has a yieldable engagement with the tire rim on which the tire is mounted.

In accordance with the general features of this invention there is provided a spare tire cover for cooperation with a spare tire mounted on a flanged tire rim and which cover has an inwardly extending circular portion formed to bear on the flange of the tire rim, this portion having a cushioned surface for contacting the inner surface of the tire rim flange.

Other objects and features of this invention will more fully appear from the following detailed description taken in connection with the accompanying drawing which illustrates several embodiments thereof and in which Figure 1 is a side view of a spare tire cover mounted on a spare tire and embodying the features of this invention.

Figure 2 is an enlarged fragmentary cross-sectional view taken on substantially the line II—II of Figure 1 looking in the direction indicated by the arrows.

Figure 3 is a side view of a modified form of cover embodying the features of this invention.

Figure 4 is an enlarged fragmentary cross-sectional view taken on substantially the line IV—IV of Figure 3 looking in the direction indicated by the arrows.

As shown on the drawing:

The reference character 10 designates generally a spare tire which is mounted upon a conventional drop-center flanged tire rim 11. This tire rim is illustrated as being part of a wheel, but of course it is to be understood that our invention is not limited to a structure wherein the rim is part of the wheel.

Mounted on the spare tire 10 is a spare tire cover designated generally by the reference character 12 and which is of the two-part type disclosed in the United States Letters Patent No. 1,807,697 of George Albert Lyon. This two-part tire cover includes a split band or tread covering portion 13 which resiliently engages the outer periphery of the tire and the outer marginal portion of a side plate 14. As disclosed in the aforesaid patent, this split band has a tendency to contract to a diameter smaller than the diameter of the outer periphery of the tire and, as a result, resiliently engages the tire and retains the side plate in proper tire protecting position over an outer side wall of the spare tire.

It is of course to be understood that my invention is not limited to a spare tire cover of two parts as will be more fully evident hereinafter when we describe our invention as applied to a one-piece cover as illustrated in Figures 3 and 4.

The side plate or portion 14 of the tire cover has an inwardly extending circular portion 15 which is provided with an annular groove 16 and in which is disposed a rubber cushioning ring 17 for contacting an inner surface 18 of a flange of the tire rim 11.

This rubber ring may be continuous, in which event it can be flexed or snapped into the groove portion 16, or it may be split and progressively pressed into the grooved portion.

By thus providing the inner periphery of the side portion of the cover with this resilient ring, we are enabled to utilize the inner margin of the cover to aid in the centering of the cover. Moreover, this resilient ring aids in the support of the side portion of the cover on the tire, thereby resulting in the cover not only having a resilient engagement with the outer periphery of the tire, but also a yieldable contact with the tire rim inwardly of the tire.

In Figures 3 and 4 we have illustrated our invention as applied to a one-piece tire cover which is of somewhat the same type as the cover disclosed in Clarence M. Ellenberger Patent No. 1,886,270.

In this form of the invention, the tire cover is designated generally by the reference numeral 20 and is illustrated as being applied to a spare tire 10 mounted on a tire rim 11. The tire cover includes a circular tread-covering portion 21 and an integral side portion 22 for disposition over an outer side wall of the tire.

The tread covering portion has secured to its under surface a plurality of circumferentially spaced yieldable elements or springs 23 for resiliently contacting the outer periphery of the tire to the rear of the median plane of the tire.

These spring elements are illustrated in Figure 3 as being six in number, but it is of course to be understood that the number of spring elements used is optional and depends upon the character of the cover on the tire desired.

This tire cover, like the Ellenberger tire cover, is adapted to be shoved axially on the tire whereby the spring elements 23 are brought into yieldable engagement with the tread of the tire to the rear of the median plane of the tire.

In order to provide for a better fit of the cover on the tire and so as to cause the cover to be centered on the tire, we have formed the inner edge of the side portion 22 in accord with the features of this invention. The side portion 22 includes an inwardly extending inner portion 24 having an annular groove 25 in which is disposed a rubber or resilient ring 26 of U-shaped cross-section. The purpose of this ring is the same as that of the rubber ring 17 previously described.

Now it is of course to be understood that while we have illustrated our invention as applied to a tire cover extending completely around a spare tire, the invention is not to be thus limited since it may be used with equal advantage in connection with a tire cover which does not extend completely around the tire but which extends around more than one-half the periphery of the tire. That is to say, as long as the cover extends around more than half of the tire it will be retained on the tire since it will hug under the upper half of the tire. In such a cover construction the resilient cushion at the inner margin of the cover serves to aid in centering and supporting the cover on the tire.

Now we desire it understood that although we have illustrated and described in detail the preferred embodiments of this invention, the invention is not to be thus limited but only insofar as defined by the scope and spirit of the appended claims.

We claim as our invention:

1. The combination with a spare tire including a flanged tire rim, of a tire cover having an inwardly extending recessed circular rubber portion providing spaced gripping areas formed to grip the flange of said rim and support the cover therefrom.

2. The combination with a spare tire including a flanged tire rim, of a tire cover having an inwardly extending circular portion formed to bear on the flange of said rim, said portion being provided with spaced resilient rubber cushion gripping means concentric with and gripping an inner surface of said rim flange and supporting the cover therefrom.

3. The combination with a spare tire including a flanged tire rim, of a tire cover including a tread covering band and a side plate for cooperating with the band and for disposition over an outer side wall of the tire and having an inwardly extending recessed circular rubber portion providing spaced gripping areas formed to grip the flange of said rim and to support the plate therefrom and center the plate on said tire.

4. The combination with a spare tire including a flanged tire rim, of a tire cover including a tread covering portion having resilient means for disposition over and for resiliently contacting the outer periphery of the tire, and a side portion for disposition over an outer side wall of the tire and having an inwardly extending circular portion formed to bear on and be supported by the flange of said rim.

5. As an article of manufacture, a spare tire cover including a circular portion for disposition over an outer side wall of a tire and having an inwardly extending circular rubber part provided with spaced gripping means formed to grip a flange of a rim on which the tire is mounted and support said portion from the flange.

6. As an article of manufacture, a spare tire cover including a circular portion for disposition over an outer side wall of a tire and having an inwardly extending circular portion formed to bear against a flange of a rim on which the tire is mounted, said portion being provided with a circular resilient cushion adapted to bear on an inner surface of the tire rim flange, said cushion comprising a rubber ring of a U-shaped cross-section.

7. As an article of manufacture, a spare tire cover including a circular portion for disposition over an outer side wall of a tire and having an inwardly extending circular portion formed to bear against a flange of a rim on which the tire is mounted, said portion defining an annular groove in which is disposed a rubber ring for contacting a tire rim flange and which ring has an annular pocket therein.

8. The combination with a spare tire including a flanged tire rim, of a tire cover including a tread covering portion having resilient means for disposition over and resiliently contacting the outer periphery of the tire, and a side portion disposed over an outer side wall of the tire and having inwardly extending circular friction means engaging the flange of the rim for frictionally supporting the side portion therefrom.

9. The combination with a spare tire including a flanged rim, of a circular member shaped to shield substantially only a side wall of the tire, and friction means frictionally connecting said shield to the tire rim so as to support said shield from said rim in proper tire protecting position without the aid of any other supporting means.

10. The combination with a spare tire including a flanged rim, of a circular member shaped to shield substantially only a side wall of the tire, and cushion means frictionally connecting said shield to the tire rim so as to support said shield from said rim in proper tire protecting position without the aid of any other supporting means.

HERBERT S. JANDUS.
ARTHUR P. FERGUESON.